Figure 1:
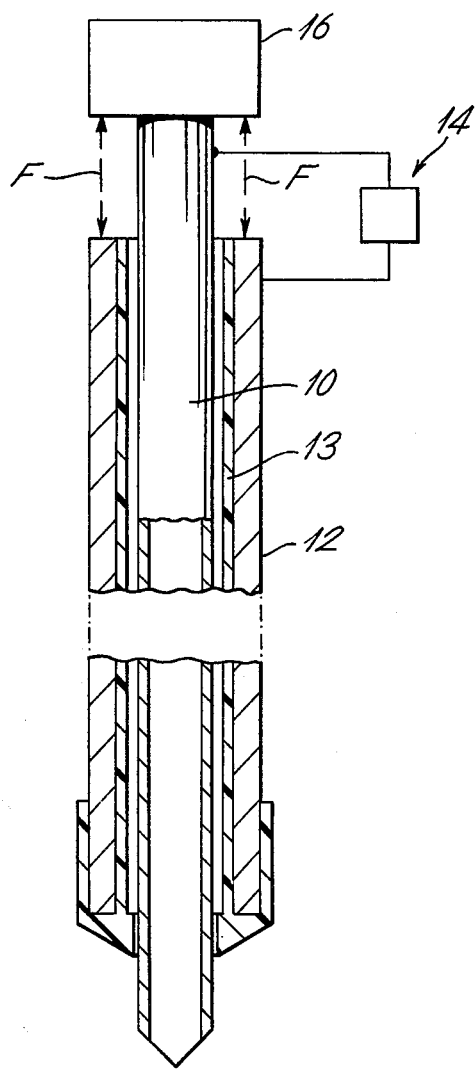

United States Patent [19]

Butterfield

[11] 4,205,362
[45] May 27, 1980

[54] APPARATUS FOR MOVING ALONG OR THROUGH A MATERIAL

[75] Inventor: Roy Butterfield, Southampton, England

[73] Assignee: National Research Development Corporation, London, England

[21] Appl. No.: 874,223

[22] Filed: Feb. 1, 1978

[30] Foreign Application Priority Data

Feb. 2, 1977 [GB] United Kingdom ............... 04206/77

[51] Int. Cl.² ............................................. H02N 1/00
[52] U.S. Cl. .................................. 361/234; 279/19; 310/300; 310/308
[58] Field of Search ...................... 310/308, 309, 310; 361/234, 233; 279/1 M, 19

[56] References Cited

U.S. PATENT DOCUMENTS

| | | | |
|---|---|---|---|
| 1,807,292 | 5/1931 | Joffe | 310/308 |
| 2,148,982 | 2/1939 | Lorenz | 361/233 X |
| 2,195,792 | 4/1940 | Straatveit | 310/308 X |
| 3,013,189 | 12/1961 | Bernier | 310/309 X |

FOREIGN PATENT DOCUMENTS

| | | |
|---|---|---|
| 771437 | 4/1957 | United Kingdom . |
| 786012 | 11/1957 | United Kingdom . |
| 1039229 | 8/1966 | United Kingdom . |
| 1110969 | 4/1968 | United Kingdom . |
| 1321995 | 7/1973 | United Kingdom . |

*Primary Examiner*—Donovan E. Duggan
*Attorney, Agent, or Firm*—Cushman, Darby & Cushman

[57] ABSTRACT

A two-part pile or probe device in which the parts can be moved relative to one another by a jacking mechanism. In operation, one of the two parts is made anodic to grip the material in which the device is to be moved, the other is made cathodic to encourage slip and the jacking mechanism is used to urge the cathodic part through the material against the anchoring action of the anodic part. The polarity of the two parts is then reversed and the process repeated to move the previously anodic part. In this way the device can be made to move through the material in a series of discrete steps as first one part and then the other is forced through the material by the jacking mechanism.

5 Claims, 2 Drawing Figures

APPARATUS FOR MOVING ALONG OR THROUGH A MATERIAL

The present invention relates to apparatus for moving along or through a material e.g. the ground or like materials.

According to the present invention, an apparatus for moving along or through a material comprises an annular first part with an electrically conductive surface for engagement with the material, a second part arranged to be at least in part surrounded by the first part and having an electrically conductive surface for engagement with the material, the two electrically conductive surfaces being connectable with a source of potential difference, electrical insulation between the two parts, and thrust means for exerting a force between the two parts to provide relative axial movement between them.

The electrical insulation may for example comprise an insulating sleeve or coating provided on the inner face of the first part and/or on the outer face of the second part.

The second part may also be annular.

Where the electrical insulation is carried on the surface of an annular one of the two parts, then the electrically conductive surface referred to above of that part will be the surface that is not carrying the insulation.

The invention also includes a method of operating an apparatus according to the present invention, the method comprising the steps of making one of said two electrically conductive surfaces cathodic and the other of said two electrically conducting surfaces anodic, and exerting a force between said two parts to provide relative axial movement between them, at least the majority of the relative motion between the two parts being provided by motion of the part having said cathodic surface.

The term "cathodic" in this context and throughout the Specification merely means that the item referred to is to be at a lower electrical potential then the item referred to an "anodic". The "cathodic surface" could, for example, be at the same local electric potential as the material along or through which the apparatus is to pass.

The apparatus and method of the present invention rely on the fact that the ease with which an electrically conductive body not carrying an electric current can pass along or through the material is increased by making the body cathodic and reduced by making the body anodic.

Figure 2:
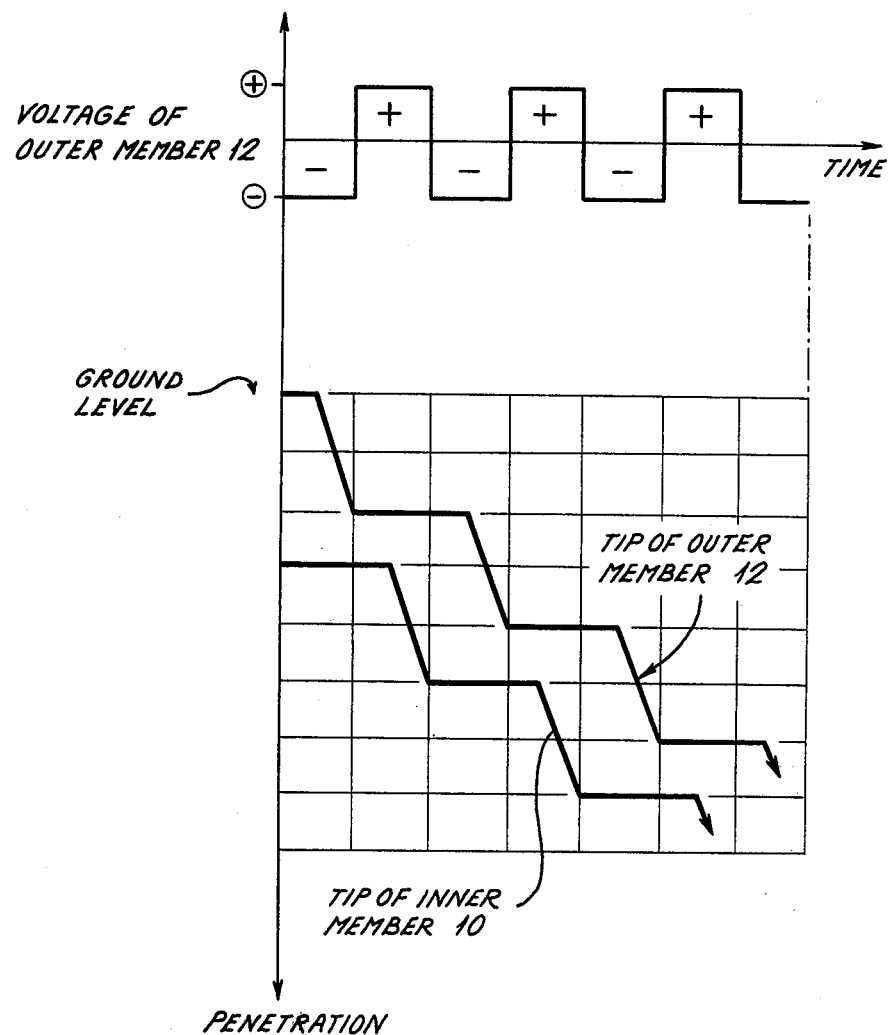

An embodiment of the invention will now be described, by way of example, with reference to the accompanying somewhat diagrammatic drawings in which FIG. 1 shows a two-part pile or probe device forming part of an apparatus according to the present invention and FIG. 2 illustrates the way in which the apparatus is operated to progress the device through the ground.

Thus referring first to FIG. 1, the inner member 10 of the device is electrically insulated from the outer member 12 by an insulating sleeve 13 so that in operation the two members can provide the two electrode parts of an electro-osmotic cell.

Reference numeral 14 indicates a reversible direct current power source for applying the appropriate polarities to the two members and reference numeral 16 indicates a jacking device for applying push-pull forces to the members.

If the outer (main) member 12 is made anodic with respect to the inner one (under a potential difference up to the order of 100 volts for piles of conventional dimensions) then, once penetration has been initiated, the additional electrically generated adhesion on the outer member will allow it to be used as a reaction against which the inner member 10 may be forced into the ground. The penetration resistance of the inner member is simultaneously reduced typically by a factor of about two by it forming the cathode of the electro-osomotic cell. Reversal of the polarity of the two parts also reverses their roles and by jacking one against the other alternately (using jacking device 16) they are both advanced into the ground without the need for any externally applied forces such as might be supplied by hammers or the like. The alternating push-pull forces are indicated by letter "F" in FIG. 1.

The relationship between the reversals in polarity, the application of the forces from jacking device 16, and the resulting penetrations of members 10 and 12 is shown in FIG. 2. To allow the differential adhesion effects on the two members to become effective following a change in polarity at source 14, there is a pause (corresponding to the horizontal parts of the lower two plots) before the actual driving is started. It will also be observed that at the starting position, the inner member 10 will already penetrate the ground. There it is held at a positive voltage (to anchor the device) whilst the outer member 12 is held at a negative voltage in readiness for the first thrust into the ground.

As the effectiveness of inner member 10 as an anchor is related to its diameter, it is desirable that this diameter should be maximised to make it as close as is practicable to the diameter of the outer member 12. For the model piles so far tested, the external diameters of members 10 and 12 were 13 mm and 15 mm respectively. For starting, the inner member was pushed into the ground some nine times the larger of these two diameters to provide the initial penetration necessary. With this set-up, the polarity of source 14 was reversed once a minute and the pause period referred to above was half a minute. With a prototype pile, however, the weight of the total apparatus involved will usually be enough to cause the initial penetration of member 10 required at the starting position and the polarity of source 14 will be reversed once every 10 minutes or so, say, with the pause period after each reversal expanded to several minutes (say 5 minutes or so) before jacking takes place. Typically in such a case, the source 14 might be provided by a large site welding set (capable of supplying a current of 300 amps at around 100 volts) and the jacking mechanism 16 might be a simple mechanical jack with a rating of the order of 30 H.P. Alternatively any other suitable conventional jacking mechanism, mechanical, hydraulic, pneumatic, or electrical could be used. Preferably the jacking device, whatever its exact form, will be able to operate equally effectively vertically, horizontally, or at any other inclination and it may then be possible to steer the device by modification of the inner electrode system in the way previously described in the above mentioned patent.

Conveniently, the stroke of the jacking means is some five or six times the external diameter of member 12. Thus during operation of the device, the inner member 10 will protrude from outer member 12 by from typically about 3 or 4 diameters to 9 diameters depending on what part of the operation cycle is being considered.

There is in principle no limit, upper or lower, to the physical dimensions of the members being driven by such a device into 'soil-like' materials. It should also be borne in mind that the material to be penetrated by the device may be submerged in water or other fluid.

I claim:

1. An apparatus for forcing itself along or through soil and like ground material with the aid of the direct application of electricity to the material, the apparatus comprising an annular first part, a first electrically conductive surface to said first part for electrically conductive engagement with the material, a second part, said second part being arranged to be movable relative to the first part and at least in part surrounded by the first part, a second electrically conductive surface to said second part for electrically conductive engagement with the material at a position separated from the first surface, the two conductive parts defining respective terminals of an external electrical path of the apparatus, means for connecting said two electrically conductive surfaces to a source of potential difference to energise the path in operation of the apparatus, electrical insulation in the apparatus between said two parts, and thrust means for exerting a force between the two parts to provide relative axial movement between them.

2. An apparatus as claimed in claim 1 in which the electrical insulation is provided on the inner face of the first part.

3. An apparatus as claimed in claim 1 in which the electrical insulation is provided on the outer face of the second part.

4. An apparatus as claimed in claim 1 in which the second part is annular.

5. A method of operating an apparatus according to claim 1, the method comprising the steps electrically energising of making one of said two electrically conductive surfaces cathodic, making the other of said two electrically conducting surfaces anodic, and exerting a force between said two parts to provide relative axial movement between them whereby at least the majority of the relative motion between the two parts is provided by motion of the part having said cathodic surface.

* * * * *